Patented Dec. 7, 1943

2,336,165

UNITED STATES PATENT OFFICE 2,336,165

CATALYTIC CONVERSION OF HYDROCARBON OILS

Gerald C. Connolly, Baton Rouge, La., assignor to Standard Oil Development Company, a corporation of Delaware No Drawing. Application August 3, 1940, Serial No. 351,248

5 Claims. (Cl. 196—52)

This invention relates to the catalytic conversion of hydrocarbon oils and pertains more particularly to a catalyst for the catalytic cracking of such oils.

One of the primary objects of the present invention is to provide an improved catalyst for the cracking of hydrocarbon oils.

A further object of the invention is to provide an improved method of preparing catalysts for the conversion of hydrocarbon oils.

It has been found that catalysts having a high order of activity for cracking hydrocarbon oils may be obtained by treating alumina with compounds of fluorine. The fluorine compounds may, for example, comprise hydrofluoric acid, ammonium fluoride, ammonium bifluoride, hydrofluosilicic acid, ammonium fluosilicate, and the like.

While active catalysts for the cracking of hydrocarbon oils may be obtained by treating various commercial grades of alumina, such as bauxite, activated alumina, various forms of hydrated alumina, and the like, it has been found that for highest efficiency the alumina should preferably be in the form of a synthetic gel or gelatinous product.

The alumina gels may be prepared, for example, by treating an aluminum salt, such as aluminum sulfate, with an alkaline solution, such as ammonium hydroxide. This reaction under controlled conditions will give a highly gelatinous precipitate which may be dried to form alumina gel. The alumina gel may be also formed by treating metallic aluminum, preferably in flakes or powder, with an organic acid, such as, for example, acetic acid. This reaction can be catalyzed by the presence of a small amount of mercury. This method of preparation tends to first produce an aluminum hydrosol which may be converted into a hydrogel.

The activity of the various forms of alumina above described may also be materially improved by treating the preferably purified gelatinous mass with a peptizing agent, such as organic acids and particularly acetic acid and formic acid. This treatment first tends to convert a part or all of the alumina into a hydrosol which upon standing solidifies or coagulates into a hydrogel. This peptizing treatment can be employed with particular advantage for regulating the density and pore size of the resulting gel.

The treatment of the alumina with the fluorine compound may be accomplished by wetting or soaking the alumina with a solution containing the fluorine compound in desired concentration. The concentration of such solution may vary over an extended range, such as from 2 to 50% or more, and still produce an active catalyst. When hydrofluoric acid is used, concentrations between 5 and 15% appear to be most effective. When fluosilicates or hydrofluosilicic acids are employed, concentrations sufficient to deposit from 2 to 25% of silica may be used. For highest activity, the amount of silica deposited by such treatment should be between 5 and 20%.

The treatment of the various types of alumina with the solution containing the fluorine compound may be accomplished while the alumina is in a relatively dry state or when it is in a hydrous form. For example, in the case of alumina gels produced either directly or by peptization, the wet gelatinous precipitate or hydrogel may be treated with a solution of the fluorine compound before being dried, or the gelatinous precipitate or hydrogel may be first dried before being treated with the solution containing the fluorine compound.

For a more complete understanding of the invention, the following examples are submitted. It will be understood, however, that the values and conditions given in the examples are illustrative rather than limitive.

In each of the following examples, the activity of the catalyst for the cracking of oils was determined by the amount of unstable gasoline which was obtained by passing an East Texas gas oil of 33.8° A. P. I. gravity through the catalyst mass at 850° F., at a rate of 0.6 volume of liquid oil per volume of catalyst per hour over a two-hour period.

Example 1

A gelatinous precipitate of alumina was first formed by reacting aluminum sulfate with ammonium hydroxide. The precipitate so formed was filtered and washed free of soluble reaction products. The resulting wet gelatinous material was then peptized to an aluminum hydrosol by treatment with acetic acid. This product was allowed to stand until it set into a hydrogel. The resulting hydrogel was slowly dried at a temperature below 212° F. and thereafter activated by slowly heating to 850° F. Separate portions of the resulting product were wetted with hydrofluoric acid solutions of 2.5%, 5%, 10%, and 15% concentrations. The resulting products when tested under the conditions above described resulted in conversions of 35%, 44%, 53%, and 61.5%, respectively.

Example 2

Separate portions of peptized alumina gel prepared as described in Example 1 were treated with hydrofluosilicic acid of such concentrations as to form catalysts containing 2.5%, 5%, 10%, and 15% silica. These products when tested under the above conditions gave conversions of 45.5%, 47%, 48%, and 48.5%, respectively.

Example 3

Peptized alumina gel prepared as described in Example 1 was treated with ammonium fluosilicate solution of such concentration as to form a catalyst containing 10% silica. This product gave a conversion of 51.5% when tested as above described.

Example 4

Separate portions of undried, unpeptized gelatinous precipitate formed by reacting aluminum sulfate with ammonium hydroxide as described in Example 1 were soaked in solutions of hydrofluoric acid of 5% and 10% concentrations. These products so treated were then drained slowly, dried at a temperature below 212° F., and thereafter activated by heating slowly to 850° F. The resulting products when tested under the above conditions resulted in conversions of 36% and 54%, respectively.

Example 5

Separate portions of undried, unpeptized gelatinous alumina were treated as in Example 4 except that hydrofluosilicic acid was employed instead of hydrofluoric acid and the concentrations were adjusted to form catalysts having 5%, 10%, 15%, and 20% of silica. These products when tested gave conversions of 53%, 53.5%, 47%, and 42.5%, respectively.

Example 6

A commercial grade of alumina known as activated alumina was treated with hydrofluosilicic acid of a concentration such as to form a catalyst containing 10% silica. This product when treated under the above conditions resulted in a conversion of 42%.

Example 7

A sample of Alabama bauxite was treated with hydrofluosilicic acid of a concentration such as to form a catalyst containing 10% of silica. This product resulted in a conversion of 23% when tested under the above-named conditions.

Example 8

A commercial grade of alumina hydrate was treated with hydrofluosilicic acid in a concentration such as to form a catalyst containing 10% of silica. This product resulted in a conversion of 42%.

Example 9

Alumina hydrate as described in Example 8 was first treated with acetic acid to peptize a portion of the alumina. The resulting product was then heated to remove the acetic acid and subsequently impregnated with hydrofluosilicic acid of a concentration such as to form a catalyst containing 10% of silica. This product when tested resulted in a conversion of 49%.

Example 10

The catalyst was prepared as described in Example 9 except that the alumina hydrate was treated with a mixed solution of acetic acid and hydrofluosilicic acid. This product under test conditions gave a conversion of 37.5%.

It has been observed that in some cases the activity of the catalyst described above becomes reduced after repeated use. More especially is this true of the less adsorbent or gel-like aluminas. The activity thereof, however, can be restored or maintained by a periodic treatment of the catalyst with fluorine compound or by continuous addition of a small amount of fluorine compound to the products undergoing reaction. For example, it was observed that one of the catalysts described in Example 1 which was treated with a solution containing 15% hydrofluoric acid, after having dropped in activity from 61.5% to 46%, could be restored to 57% upon being treated with a solution containing 2.5% hydrofluoric acid.

Having described the preferred embodiments of the invention and given specific examples thereof, it will be understood that it embraces such other variations and modification as come within the spirit and scope thereof.

I claim:

1. A method of cracking hydrocarbon oils which comprises passing the oil in vapor form while at cracking temperature in contact with a catalyst comprising an alumina gel which has been treated with a solution containing a fluorine compound, and maintaining said oil in contact with said catalyst for a period sufficient to obtain the desired conversion.

2. A method of cracking hydrocarbon oil which comprises passing the oil to be cracked while at cracking temperature in contact with a catalyst comprising an alumina gel which has been treated with a solution containing a fluorine compound, and maintaining said oil in contact with said catalyst for a period sufficient to obtain the desired conversion.

3. A method of cracking hydrocarbon oil which comprises passing the oil to be cracked while at cracking temperature in contact with a catalyst comprising peptized alumina gel which has been treated with a solution containing a fluorine compound.

4. The invention defined in claim 3 wherein the fluorine compound consists of hydrofluoric acid.

5. A method of cracking hydrocarbon oil which comprises subjecting the oil to be cracked while at cracking temperature to a cracking catalyst comprising an alumina gel impregnated with silica formed by treating alumina with a fluosilicate and continuing the treatment until the desired conversion has been obtained.

GERALD C. CONNOLLY.